US009871939B2

(12) United States Patent
Nakashima

(10) Patent No.: US 9,871,939 B2
(45) Date of Patent: Jan. 16, 2018

(54) APPARATUS, SYSTEM AND METHOD FOR IMPLEMENTING SWITCH-OVER CONTROL

(71) Applicants: Canon Information and Imaging Solutions, Inc., Melville, NY (US); Canon U.S.A., Inc., Melville, NY (US)

(72) Inventor: Kosuke Nakashima, Kawasaki (JP)

(73) Assignees: CANON INFORMATION AND IMAGING SOLUTIONS, INC., Melville, NY (US); CANON U.S.A., INC., Melville, NY (US)

( * ) Notice: Subject to any disclaimer, the term of this patent is extended or adjusted under 35 U.S.C. 154(b) by 0 days.

(21) Appl. No.: 15/136,254

(22) Filed: Apr. 22, 2016

(65) Prior Publication Data

US 2016/0323472 A1 Nov. 3, 2016

Related U.S. Application Data

(60) Provisional application No. 62/154,607, filed on Apr. 29, 2015.

(51) Int. Cl.
*G06F 3/12* (2006.01)
*H04N 1/00* (2006.01)
*H04N 1/32* (2006.01)

(52) U.S. Cl.
CPC ....... *H04N 1/00928* (2013.01); *G06F 3/1204* (2013.01); *G06F 3/1231* (2013.01); *G06F 3/1236* (2013.01); *H04N 1/0097* (2013.01); *H04N 1/00204* (2013.01); *H04N 1/00938* (2013.01); *H04N 1/32507* (2013.01);

(Continued)

(58) Field of Classification Search
CPC ............. H04N 1/00928; H04N 1/0097; H04N 1/32507; H04N 1/00938; H04N 1/00204; G06F 3/1204; G06F 3/1231; G06F 3/1236
USPC ....................................................... 358/1.15
See application file for complete search history.

(56) References Cited

U.S. PATENT DOCUMENTS

2006/0047853 A1* 3/2006 Igarashi ............ H04L 29/12028
709/245
2006/0087675 A1* 4/2006 Terada ................... G06K 15/00
358/1.14

(Continued)

*Primary Examiner* — Neil R McLean
(74) *Attorney, Agent, or Firm* — Canon USA Inc., IP Division

(57) ABSTRACT

An image processing device and method of controlling an image processing device to be in communication with one of a plurality of external printer controllers is provided. The method includes monitoring, at initiation of the image processing device, a communication address assigned to the image processing device to detect whether a current communication address is different from a previously assigned communication address and acquiring, from memory, a configuration data object associated with the current communication address in response to detecting that the current communication address is different from the previously assigned communication address. The configuration data object being associated with the current communication address and includes one or more parameters for controlling one or more operations of the image processing device. The image processing device is automatically configured the image processing device using the one or more parameters acquired from the configuration data object.

15 Claims, 6 Drawing Sheets

(52) U.S. Cl.
CPC ............... *H04N 2201/0039* (2013.01); *H04N 2201/0094* (2013.01)

(56) References Cited

U.S. PATENT DOCUMENTS

| | | | |
|---|---|---|---|
| 2009/0135793 A1* | 5/2009 | Nandagopal | H04L 29/12311 370/338 |
| 2011/0205581 A1* | 8/2011 | Machii | H04L 41/082 358/1.15 |
| 2016/0188647 A1* | 6/2016 | Chang | G06F 17/30292 707/805 |

* cited by examiner

APPARATUS, SYSTEM AND METHOD FOR IMPLEMENTING SWITCH-OVER CONTROL

CROSS-REFERENCE TO RELATED APPLICATIONS

This nonprovisional application claims the benefit of U.S. provisional patent application Ser. No. 62/154,607 filed on Apr. 29, 2015 which is incorporated herein by reference in its entirety.

BACKGROUND OF THE INVENTION

Field of the Invention

The present invention relates generally to controlling which settings are active in at least one image processing device.

Description of the Related Art

In certain printing environments there are a plurality of image processing devices that need to be controlled, in concert with one another, in order to complete print jobs in a timely manner that also maximizes the amount of resources available to complete these print jobs. Conventionally, these workflow synchronization operations are performed using a print controller. Print controllers manage all aspects and settings associated with electronic print job data being output by the image processing devices. Print controllers provide advantages in terms of scalability and consistency of product being output by the image processing apparatuses. However, in order to enable the image processing devices to fully benefit, each of the image processing devices must be separately configured via a client computer that connects to the image processing device via the print controller. The client computer can be used to selectively set various parameters and settings of the image processing device. However, there are certain drawbacks associated with system configuration such as this when considering printing environments that include more than one type of print controller each able to control one or more image processing devices. A system according to invention principles remedies the defects discussed above

BRIEF SUMMARY OF THE INVENTION

Methods, systems, and computer-readable media for managing processes executed on an image processing device are disclosed.

In one embodiment, an image processing device including a controller and a memory storing an application therein, the application, when executed by the controller causes the image processing device to monitor, at initiation of the image processing device, a communication address assigned to the image processing device to detect whether a current communication address is different from a previously assigned communication address. A configuration data object is acquired, from the memory in response to detecting that the current communication address is different from the previously assigned communication address. The configuration data object is associated with the current communication address and includes one or more parameters for controlling one or more operations of the image processing device. The image processing device is automatically configured using the one or more parameters acquired from the configuration data object.

In certain embodiments, a current communication address is associated with a first printer controller and a second communication address is associated with a second, different printer controller. The current communication address and previously registered communication address may be different private IP addresses. In other embodiments, the current communication address was set prior to initiation of the image processing device and is associated with an external printer controller selected from a set of external printer controllers, each respective external printer controller having a unique communication address associated therewith for assignment to the image processing device to enable communication between the respective external printer controller and the image processing device. In other embodiments, initiation of the image processing device includes at least one of (a) initial startup in response to the image processing device being powered on; and (b) a reboot of the image processing device.

In another embodiment, the image processing device includes an input mechanism responsive to input received from a user and which generates a signal indicative of a printer controller selected from a set of printer controllers to be associated with the image processing device. In this embodiment, the application controls the image processing device to monitor the signal from the input mechanism and identify a communication address for the printer controller using the signal. The application determines whether the current communication address is equivalent to the identified communication address and initiates a reboot of the image processing device in response to determining that the identified communication address is different from the current communication address.

In another embodiment, the application controls the image processing device to detect a signal indicating that the current communication address is to be changed to an updated communication address different from the current communication address and set the current communication address as a previously registered communication address the updated communication address as the current communication address. Thereafter, the application initiates a reboot of the image processing device In a further embodiment, a method of controlling an image processing device to be in communication with one of a plurality of external printer controllers is provided. The method includes monitoring, at initiation of the image processing device, a communication address assigned to the image processing device to detect whether a current communication address is different from a previously assigned communication address and acquiring, from memory, a configuration data object associated with the current communication address in response to detecting that the current communication address is different from the previously assigned communication address. The configuration data object being associated with the current communication address and includes one or more parameters for controlling one or more operations of the image processing device. The image processing device is automatically configured the image processing device using the one or more parameters acquired from the configuration data object.

In other embodiments, the method includes monitoring a signal generated by an input mechanism, the signal being received from a user and indicative of a printer controller selected from a set of printer controllers to be associated with the image processing device, identifying a communication address for the printer controller using the signal, determining whether the current communication address is equivalent to the identified communication address, and initiating a reboot of the image processing device in response to determining that the identified communication address is different from the current communication address.

In yet another embodiment, the method includes detecting a signal indicating that the current communication address is to be changed to an updated communication address different from the current communication address; setting the current communication address as a previously registered communication address; setting the updated communication address as the current communication address; and initiating a reboot of the image processing device.

Another embodiment is provided including a non-transitory computer readable storage medium storing instructions that, when executed by a controller, cause an image processing device to execute a method of controlling an image processing device to be in communication with one of a plurality of external printer controllers. The method includes monitoring, at initiation of the image processing device, a communication address assigned to the image processing device to detect whether a current communication address is different from a previously assigned communication address and acquiring, from memory, a configuration data object associated with the current communication address in response to detecting that the current communication address is different from the previously assigned communication address. The configuration data object being associated with the current communication address and includes one or more parameters for controlling one or more operations of the image processing device. The image processing device is automatically configured the image processing device using the one or more parameters acquired from the configuration data object.

In one embodiment, an image processing device includes at least one processor and a memory including at least one computer executable application, which when executed by the at least one processor causes the image processing device to receive a type of input from a user, the type of input indicative of a connection to one of a plurality of print controllers. The application sets a communication address of the image processing device based on the type of input and automatically acquires, from a data store of the image processing device, at least one setting associated with the print controller via the communication address and configures the image processing device using the at least one setting, wherein the at least one setting is associated with the print controller and is different from settings associated with others of the plurality of print controllers.

In another embodiment, a system for configuring an image processing device to operate with a print controller includes a switch that enables the image processing device to receive input from a user. A setting processor is coupled to the switch and sets an IP address for the image processing device in response to the user input via the switch and a configuration processor that sets at least one configuration value of the image processing device in response to setting the IP address.

In another embodiment, a system for configuring an image processing device to operate with a print controller includes a switch that enables the image processing device to receive input from a user and a setting processor that automatically sets an IP address for the image processing device in response to the user input and changes at least one configuration value of the image processing device in response to setting the IP address.

In some embodiments, the IP address set by the setting processor is specific to the print controller and the at least one configuration value includes a setting specified by the print controller and stored in a storage device of the image processing device which causes the image processing device to operate in an accordance with and controlled by the print controller.

In another embodiment, a system that configures and controls a printing system is provided. The system includes a private network that is inaccessible to a wide area network. A first print controller specifies a first IP address for the image processing device and a second print controller that specifies a second IP address for the image processing device, the second IP address being different from the first IP address. An image processing device including at least one processor and memory having at least one application that when executed by the at least one processor selectively connects the image processing device to one of the first print controller or the second print controller, via the private network, by setting an image processing device IP address equal to one of the first or second IP addresses and automatically loading into memory of the image processing device at least one configuration value associated with the one of the first or second print controllers associated with the set IP address.

Further features of the present invention will become apparent from the following description of exemplary embodiments.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION

Figure 1A:
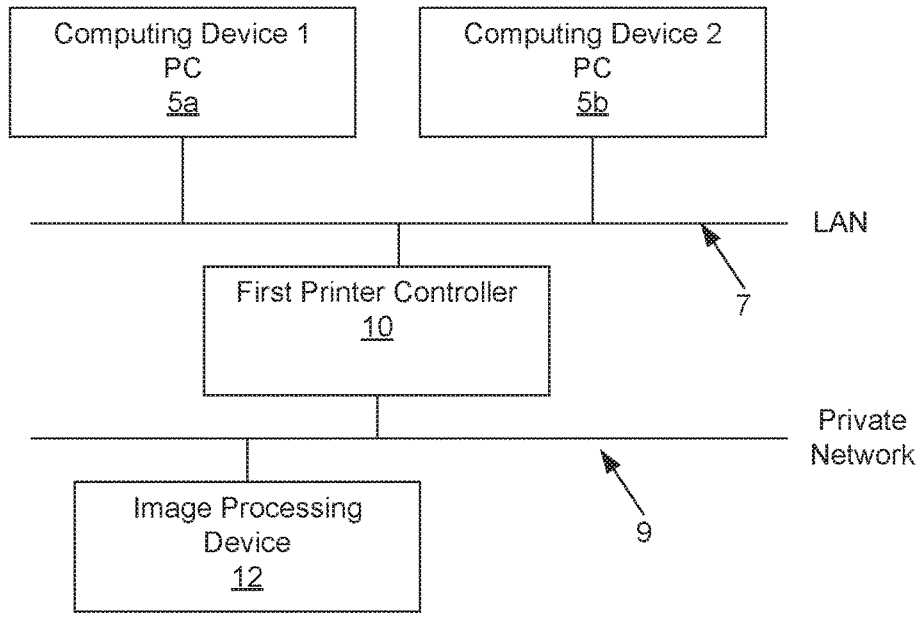
FIGS. 1A & 1B illustrates printing environments of the prior art.
Figure 1B:
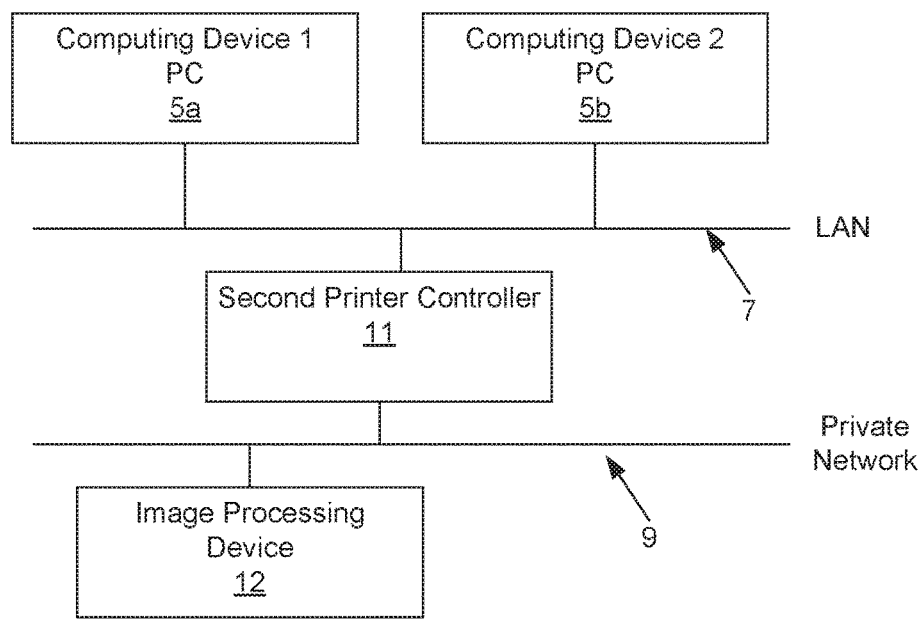

Embodiments of the present invention are described with reference to the drawings. According to invention principles a system is provided for selectively configuring an image processing device to operate with a print controller in an environment where at least two different print controllers may be required. The system advantageously initiates configuration control on the image processing device itself and decreases setup and configuration times typically required when a single image processing device having been configured to work with a first print controller needs to be connected and configured to work with a second different print controller. FIGS. 1A & 1B will illustrate the conventional manner of connecting and configuring an image processing device with different print controllers in respective customer environments where only a single print controller is typically deployed. The term printer controller as used herein may also be referenced as print controller, external print controller, external printer controller and the like and should be construed to be equivalent structural elements. The term print controller may include any computing device or server that receives print job data from a client computing device (e.g. personal computer, laptop, tablet or other server) and controls an image processing device to output the receive print job data on a particular type of output medium. The print controller manages a plurality of print job characteristics to be applied to the received print job data to ensure that the data being sent from the print controller to the image processing device is output in the manner intended. For example, the print controller may selectively perform color management processing and image quality processing on the print data by using color data of the image processing device in combination with the received print data to ensure that the output from the image processing device meets a desired quality level. In other examples, the print controller may selectively identify and manage a plurality of different types of output mediums that may be required to complete and process the received print job. This may include calibrating various parameters of the image processing device so that respective portions of the received print job data are output on at least one of a desired type of output medium having a desired output medium size while ensuring that the data being output is rendered uniformly and will have consistent characteristics (e.g. uniform color, uniform gradient, uniform shading, uniform texture, etc.) no matter the type of medium. A print controller may also selectively receive a plurality of different print jobs from a plurality of client devices and can selectively determine and control the workflow to ensure that the received print jobs are output in an efficient manner while minimizing resource waste of the image processing device. The print controller sets a plurality of parameters values that are used by the image processing device which allows for the image processing device to output the print job data in accordance with the image processing performed by the print controller on the received print job data.

In the customer environment depicted in FIGS. 1A & 1B, an image processing device 12 is selectively connected with and controlled by a first external printer controller 10 (in FIG. 1A) or a second external printer controller 11 (in FIG. 1B). The connection between the image processing device 12 and the first external print controller 10 and/or the second external print controller 11 is made via a private communications network 9 which prevents the image processing device 12 from receiving data from any computing device that is also not on the private network 9. In order to effectuate a print job, at least one computing system 5a and/or 5b (e.g. PCs) are coupled to one of the first external print controller 10 or the second external print controller 11 by a local area network 7 which is a non-private network that allows for connections to device both on the non-private network 7 and devices on other communications networks such as wide area networks (e.g. the internet). The computing systems 5a/5b are unable to directly connect to the image processing device 12 due to the private network connection 9 between the print controllers 10/11 and the image processing device 12 and instead can only communicate with the image processing device 12 through a respective one of the first external print controller 10 or the second external print controller 11. Thus, the computing system 5a/5b need to submit any print jobs through the external printer controller 10/11 which includes at least one print processing application that selectively manages the print job submitted by the computing device and configures and controls the image processing device to output the print job submitted by the computing system in a desired manner.

In one embodiment, the at least one application of the print controller configures one or more settings and parameters of the image processing device in order to ensure that the image processing device outputs a print job in a desired manner. For example, the one or more settings of the image processing device may include color settings relating to the output of color ink or toner on a recording medium. Other types of setting selectively configurable by the print controller may relate to the type and/or size of recording media used by the image processing device relative to a particular print job. These settings are described for purposes of example only and the one or more application executed by the print controller may selectively configure and control any setting or parameter of the image processing device. Additionally, these settings may be configured to apply one of globally or on a job-specific basis.

In typical operation, a user generates a print job to be output by the image processing device. The computing device communicates a data object representative of a print job including print configuration data and job data to the print controller. A print driver associated with the external printer controller is installed in computing system and the print job is generated by the computing system using the print driver. The print job data object can be transmitted to and processed by external controller and further forwarded to the image processing device after the external controller processes print job.

In the environments illustrated in FIGS. 1A and 1B, each of the computing systems 5a/5b are connected to one of the first print controller 10 or the second print controller 11 via a global network such as a local area network which enables bidirectional communication between the computing system and the printer controllers. The connection between the external printer controller and the image processing device is via Ethernet connection using crossover cables. Thus, the external printer controller is considered a master while the image processing device is considered a slave meaning that the image processing device cannot be contacted directly by any device other than the external printer controller. This effectively creates a private network through which the external printer controller is connected to and communicates with the image processing device. The term private network, as used herein, refers to a type of communication network where certain of the devices connected thereon do not have access to and/or are not permitted to access a global network such as the internet. This also means that certain of the devices on this private network are identified by a communication address that is not discoverable by computing systems (e.g. servers, PC's, etc.) able to communicate via a global network. This holds true even if one or more of the devices on the private network is a device that has access to a global network such as the internet.

Figure 2:
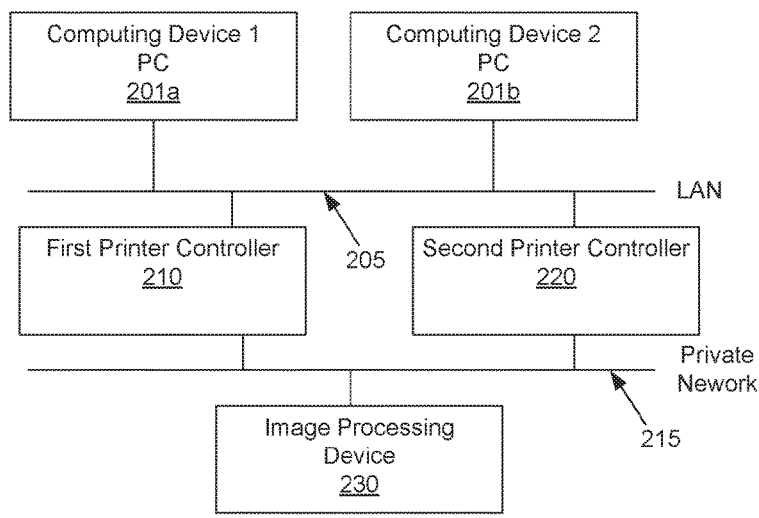
FIG. 2 illustrates a network printing environment include two print controllers each of which are able to control the operation of the image processing device

FIG. 2 illustrates a printing environment where at least two external print controllers, a first printer controller 210 and a second printer controller 220, each of a different type, are selectively connectable to an image processing device 200. While FIG. 2 illustrates two printer controllers, this is done so to more easily illustrate the principles of the invention and should not be considered as limiting operational environments to two printer controllers. Any number of different types of printer controllers can be connected in the manner shown here.

Because each of the first printer controller 210 and second printer controller 220 have their own features and settings which can be applied to the image processing device 200, and by virtue of the network architecture needed for controlling the image processing device 200, only one of the first printer controller 210 or the second printer controller 220 may be connected to an image processing device 200 at a given time. More specifically, the external print controller is a hybrid computing device that is identifiable to other computing devices on a network using a unique global communication address (e.g. global IP address). Being identifiable via a global communication address allows for bidirectional communication, via a local area network 215, between a respective one of the external print controllers 210/220 and one or more computing devices 201a/201b (PC's) shown in FIG. 2. However, each of the first printer controller 210 and the second printer controller 220 are able to create a private network 215 between itself and one or more image processing devices 200. This advantageously enables network communication (and all benefits associated therewith) between the external print controller 210/220 and the image processing device 200 using common communication protocols such as TCP/IP. This network is created by each of the first printer controller 210 and the second printer controller 220 having a predetermined private communication address that will be assigned to the image processing device 200 when the respective printer controller 210. This predetermined private communication address is formatted such that, despite identifying the image processing device 200, the particularly image processing device 200 would not be accessible to a device other than the particular external printer controller (first printer controller 210 or second printer controller 220) that has provided that address. Thus, while the global communication address and the private communication address may be of the same type (e.g. IP addresses), the format of the global communication address is different than the format of the private communication address as is known in the art.

Because the image processing device 200 can only be identified by a single private communication address in this environment, significant time and resources are required to change the configuration from a first external printer controller 210 to a second external print controller 220 (or vice versa). This environment is commonly illustrated in a showroom setting where a merchant or dealer who may supply both types of external print controllers would seek to demonstrate each of them to a customer using the same image processing device 200. Previously, to do so, a dealer would have to manually disconnect a first print controller 210 from the image processing device 200 and connect the second print controller 220 to the image processing device 200. Since the second print controller 220 includes a communication address different from the first print controller 210, a technician would have to manually change the communication address on the image processing device and then make use of a separate computing device, such as a PC 201a/201b, connected to the particular external print controller via the LAN to remotely access and configure the settings for the image processing device 200 specific to the second printer controller 220 and push the settings to the image processing device 200 which is only now recognizable to the second print controller 220 by virtue of the manual change of communication address. This process is cumbersome and time consuming especially considering that this is only being done to demonstrate two potential products to the customer.

The system according to invention principles illustrated in FIGS. 2-7 remedy these defects by advantageously providing a single application executing on the image processing device that quickly and efficiently enables switchover control between two different external printer controllers thereby being able to demonstrate the operation of both using a single image processing device.

FIG. 2 illustrates the printing environment where a single image processing device is selectively connectable to one of a first print controller and a second print controller via a private network. While not expressly shown herein, the manner in which the first and second print controllers may be connected to the image processing device may include direct connection via crossover cables. Alternatively, a networking switch that controls packet communications between one or more devices may also be disposed such that each of the first printer controller, second printer controller and image processing device are connected to one another via a networking switch capable of routing packets between either the first printer controller and the image processing device or the second printer controller and the image processing device.

FIG. 2 also includes a plurality of computing devices 201a/201b connected to each of the first printer controller 210 and second printer controller 220 via a local area network 205 which allows a print job to be generated and communicated to the respective printer controller for output on the image processing device 200. While two PCs are shown it should be noted that both are not required, and the environment can operate using only a single computing device that can selectively access each of the first printer controller and second printer controller to generate print jobs for output by the image processing device. In certain other embodiments, the computing device may include any of a smartphone, personal digital assistant, tablet computing device or wearable computing device. Any computing system able to generate print job data may be used in conjunction with the architecture described herein.

To effectuate connection with and communication between one of the first printer controller 210 or second print controllers 220, the image processing device 200 may include an application stored in memory that is executed by a controller or other processing unit of the image processing device 200. The application automatically configures the image processing device 200 with the settings associated with the correct printer controller. An example of the hardware for accomplishing this operation is disclosed in FIG. 3.

Figure 3:
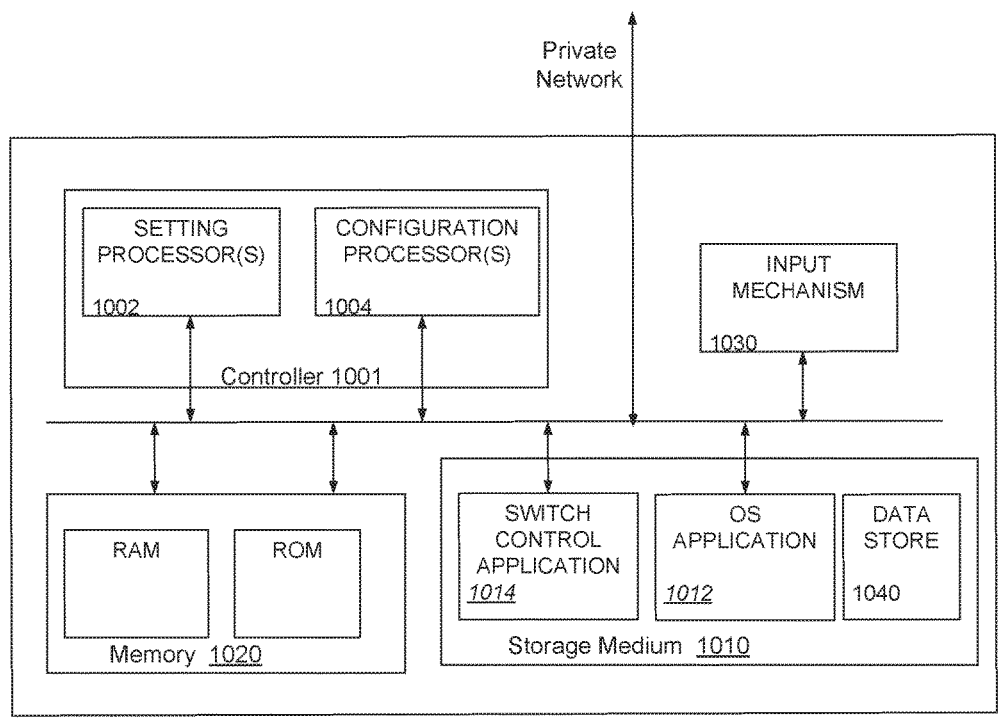
FIG. 3 illustrates an example image processing device according to invention principles.

FIG. 3 represents a block diagram of certain internal hardware processors and various software applications that are executable by the hardware processors to control the image processing device to operate in an intended manner.

The image processing device 1000 includes a controller 1001 which may be formed from a central processing unit for controlling all operations of the image processing device 1000. The image processing device 1000 may be the same image processing device 200 discussed above in FIG. 2. The controller 1001 may also include one or more application specific processors (ASICs) that are configured to perform one or more particular application specific tasks. The controller 1001 selectively accesses one or more applications stored on a storage medium 1010 (e.g. hard drive, solid state drive, etc.) to load the application into active memory 1020 thereby enabling the image processing device to perform one or more functions of the applications loaded into memory 1020.

The image processing device 1000 may also include at least one input mechanism 1030 that is able to receive input from a user, the result of which triggers the controller 1001 to perform one or more functions. In one embodiment, the input mechanism is a dipswitch that causes the controller 1001 to operate in one of two operational states. For example, depending on the position of the switch, the controller 1001 is provided input identifying a respective one of the first print controller or second print controller as being the desired print controller to be coupled thereto at a given time. For purposes of this description the term switch should not be limited to a binary switch and instead may include any type of switching mechanism that defines one or more parameters of an image processing device 200. In another embodiment, the input mechanism is capable of receiving human input from a user. In a further embodiment, the input mechanism may include a dedicated button on the image processing device. In yet another embodiment, the input mechanism may be selectively displayed on a screen or operational panel and include a use selectable image element which facilies receipt of input from a user to change the configuration of the image processing device.

Exemplary operation of the image processing device 1000 will now be described. At startup, the controller 1001 causes the OS application 1012 to be executed resulting in the operating system of the image processing device 1000 to be loaded into memory 1020 enabling general operation of the image processing device. Also, a switching control application 1014 is also executed by the controller 1001 and loaded into memory. The switching control application monitors the currently configured communication address for any changes and executes a switching routine, which will be described hereinafter, in the event such a change is detected. The switching control application monitors the communication address of the image processing device upon initiation thereof. Initiation may include an initial power up when power is first applied to the image processing device or on reboot of the image processing device caused by a reboot control signal or command generated by the operating system or some other application executing on the image processing device.

The following operation presumes that the input mechanism has previously be configured to designate the first printer controller (210 in FIG. 2) as the active printer controller and that the image processing device 1000 has been previously configured by the first printer controller 210 to operate in accordance therewith. As such, the image processing device 1000 is configured to be identifiable by the first private communication address and is able to output a print job created by one of the computing devices (201a/201b in FIG. 2), transmitted to the first printer controller 210 for output by the image processing device 1000.

In the event that a user wishes to connect the image processing device 1000 with the second printer controller (220 in FIG. 2), a user can provide an input indicative of such using the input mechanism 1030. In one embodiment, the input may be a physical repositioning or actuation of a switch from a first position to a second different position wherein the second different position indicates that connection to the second printer controller is desired. In another embodiment, the input mechanism may include more than two selectors having first and second positions such that one combination of positions of the more than two selectors indicates connection to the first printer controller 210 and, by modifying the positions of the selectors, the result is indicative of connection with the second printer controller 220. In another embodiment, the input mechanism may include a first button associated with the first printer controller 210 and a second button associated with the second printer controller 220 wherein, when one of the respective buttons is pushed, a signal is generated indicating the selected printer controller and, once received by the controller 1001, causes the image processing device 1000 to be configured with one or more parameters associated with the selected printer controller. While the input described as a physical input, the input may also be a digital input received via another different device in communication with the image processing device. Alternatively, the input may include selection of a user selectable image element generated by the switching control application 1014 and presented on a user interface of the image processing device 1000. Any type of input may be used to effectuate this switchover control. In another embodiment, the input can be received from a device external to the image processing device 1000 using direct connection via a short distance communication protocol (e.g. NFC or Bluetooth with a portable device such as a smart phone.

While the switch control application 1014 is executing, a setting processor 1002 (which may be included as part of the controller 1001 or as a separate processing unit distinct from the CPU of the controller), selectively monitors input received via the input mechanism 130. The monitoring of the input mechanism by the switch control application may occur one of (a) continually, (b) periodically, (c) at a predetermined time period. The setting processor 1002, upon receipt of an input, identifies the input signal as an input signal that corresponds to one of the first print controller 210 or second print controller 220 and queries a data store 1040 which includes a data object stored therein representing a table of communication addresses corresponding to the various external print controllers. In the environment described herein, the data object would include a table having two records, one including a data value representing the private communication address associated with the first printer controller 210 and the other including a data value representing the private communication address associated with the second printer controller 200. This structure is described to represent this environment but the data object stored in data store 1040 should not be construed as limited to two records for two external printer controllers. Instead, any number of external printer controllers can be used in accordance with invention principles and the data object shall include a number of records equal to a number of external printer controllers in a given operational environment.

The setting processor 1002 retrieves, from the data store 1040, the private communication address associated with the print controller identified from the input signal and compares the retrieved private communication address with the current private communication address that is set as a communication setting for the image processing device 1000. If the results match, nothing occurs, and the switch control application 1014 continues to monitor the input mechanism 1030 for signals generated by further user inputs. If the retrieved private communication address and the current private communication address does not match as determined by the comparison, the switch control application 1014 determines that a change in active printer controllers is desired and causes the setting processor 1002 to set, as the private communication address of the image processing device 1000, the retrieved private communication address which corresponds to the private communication address of the second printer controller 220. In one embodiment, the signal generated by the input may include data representing the private communication address to be used by the setting processor 1002. In one embodiment, a log is created by the switch control operation to identify the current private communication address and time of input associated with the change request.

Once, the setting processor 1002 changes the current communication address of the image processing device to be equal to the second private communication address, the switch control application 1014 initiates a reboot request for the OS application 1012 resulting in the image processing device 1000 rebooting and clearing the memory of any previously active configuration values associated with the first printer controller 210. In another embodiment, a user may manually reboot the image processing device in response to the setting processor 1002 generating a message for display via a user interface indicating that the communication address of the image processing device has been set and, in order to take effect, the image processing device 1000 needs to be rebooted. In a further embodiment, the message generated may include a user selectable image element that, when selected, issues a reboot instruction resulting in the rebooting of the image processing device 1000.

Upon rebooting, the switch control application 1014 engages the configuration processor 1014 to identify the currently set private communication address of the image processing device 1000. The configuration processor 1014 queries the data store 1040 to locate at least one configuration data object associated with the currently set second private communication address associated with the second printer controller 220. The configuration data object stored in the data store 1040 is a data object including one or more parameters that are specific to a a respective type of printer controller and which the printer controller sets for the image processing device to enable output of the print job. For example, a first configuration data object may be specific to the first printer controller and include data values used to configure one or more settings of the image processing device to communicate with and be controlled by the second printer controller. Similarly, a second configuration data object may be specific to the second printer controller and include data calues used to configured one or more settings of the image processing device to communicate with and be controlled by the second printer controller. In another embodiment, a single configuration data object may be stored and partitioned to include multiple records corresponding to a plurality of printer controllers where each record contained therein includes data values for configuring the image processing device to operate with the respective printer controller. In this embodiment, the configuration processor may parse the configuration data object to identify the selected one of the plurality of printer controllers and extract the data values to configure the image processing device accordingly to be able to communicate with and be controlled by the respective selected printer controller. The configuration data object includes one or more configuration values that have been previously configured (or been provided by the second printer controller 220) to correspond to the settings and configurations of the second printer controller 220. Upon locating the stored configuration data object associated with the second printer controller, the configuration processor 1004 imports or otherwise loads, into memory 1020, the values contained in the configuration data object thereby configuring the image processing device 1000 to be connected to and operational with the second printer controller 220. In this manner, once the configuration values are set for the image processing device 1000 to be compatible with the second print controller 220, any image processing performed on the data to be printed can be output as intended when the print job was submitted.

It should be noted that, in addition to the configuration data object for the second printer controller 220 being stored in storage medium 1010 (or alternatively, the data store 1040), a configuration data object associated with the first printer controller 210 is also stored therein and, should the user desire to switch back to the first printer controller 210, the same process illustrated above will apply such that the switch control application 1014 will detect any input signal including information identifying and associated with the first controller 210 and change the communication address and import or load settings associated with the first printer controller 210.

Figure 4:
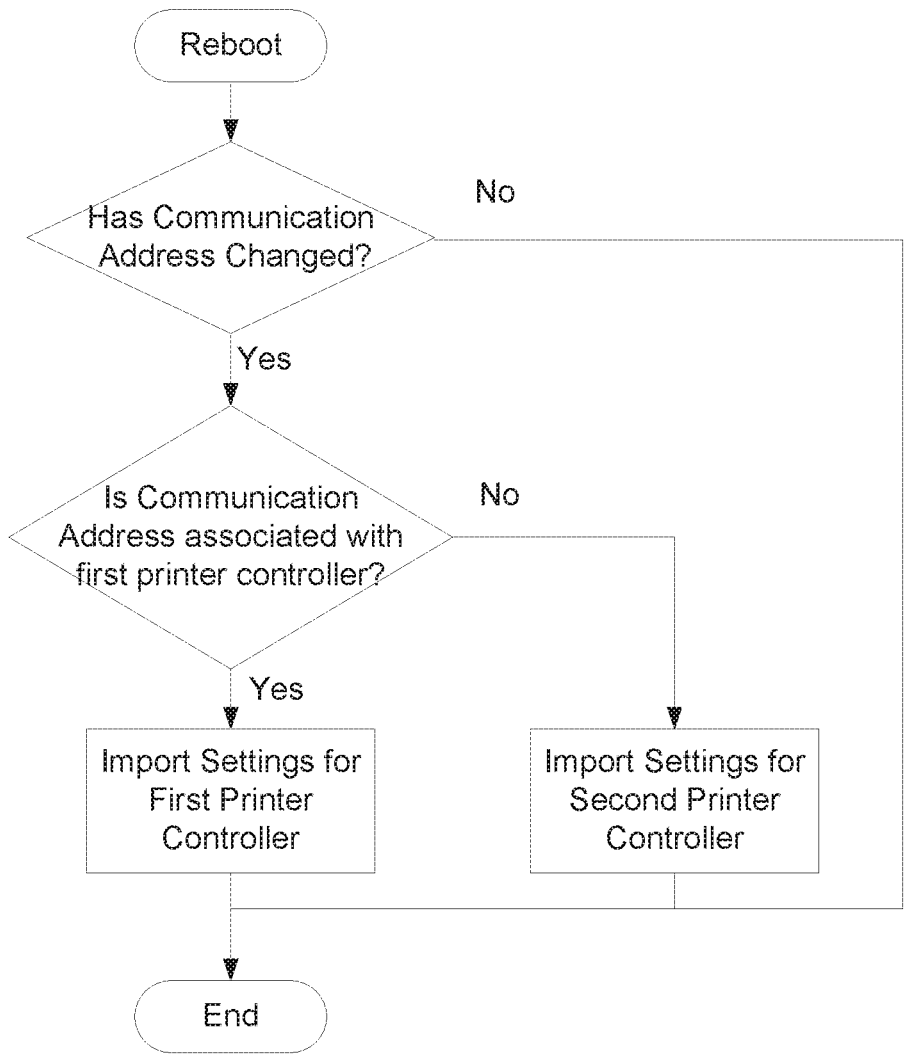
FIG. 4 illustrates an exemplary flow diagram detailing exemplary system operation.
Figure 5:
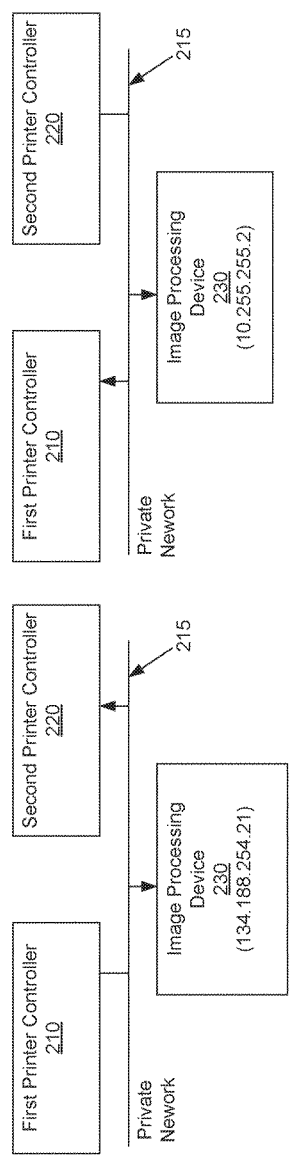
FIG. 5 illustrates the connection of the image processing device with one of the two print controllers illustrated in FIG. 2.

A flow diagram illustrating an exemplary algorithm implemented in the switch control application 1014 is shown in FIG. 4. In this embodiment, the switch control application 1014 initiates a reboot request of the operating system in step 402. Upon rebooting, the switch control application 1014 detects if the current communication address (e.g. IP address) has changed from a previously set communication address in step 404. If the result of the query in step 404 is negative, then the configuration of the image processing device remains in its current form. If the result of the query in step 404 is positive indicating a change in address, the switch control application 1014 determines whether the current communication address is associated with the first printer controller 210 in step 406. If the result of the query in step 406 is positive, the switch control application 1014 causes settings from a first data object associated with the first printer controller 210 and which was previously stored in the memory of the image processing device 1000 to be loaded in step 408. If the switch control application 1014 ins step 406 determines that the communication address is not associated with the first printer controller 210, the switch control application 1014 identifies that the communication address is associated with the second printer controller 220 and causes settings from a second data object associated with the second printer controller 220 and which was previously stored in the memory of the image processing device to be loaded. The results of this algorithm are shown in FIG. 5 which illustrates the setting of the printer controller specific private communication addresses in the image processing device.

Figure 6:
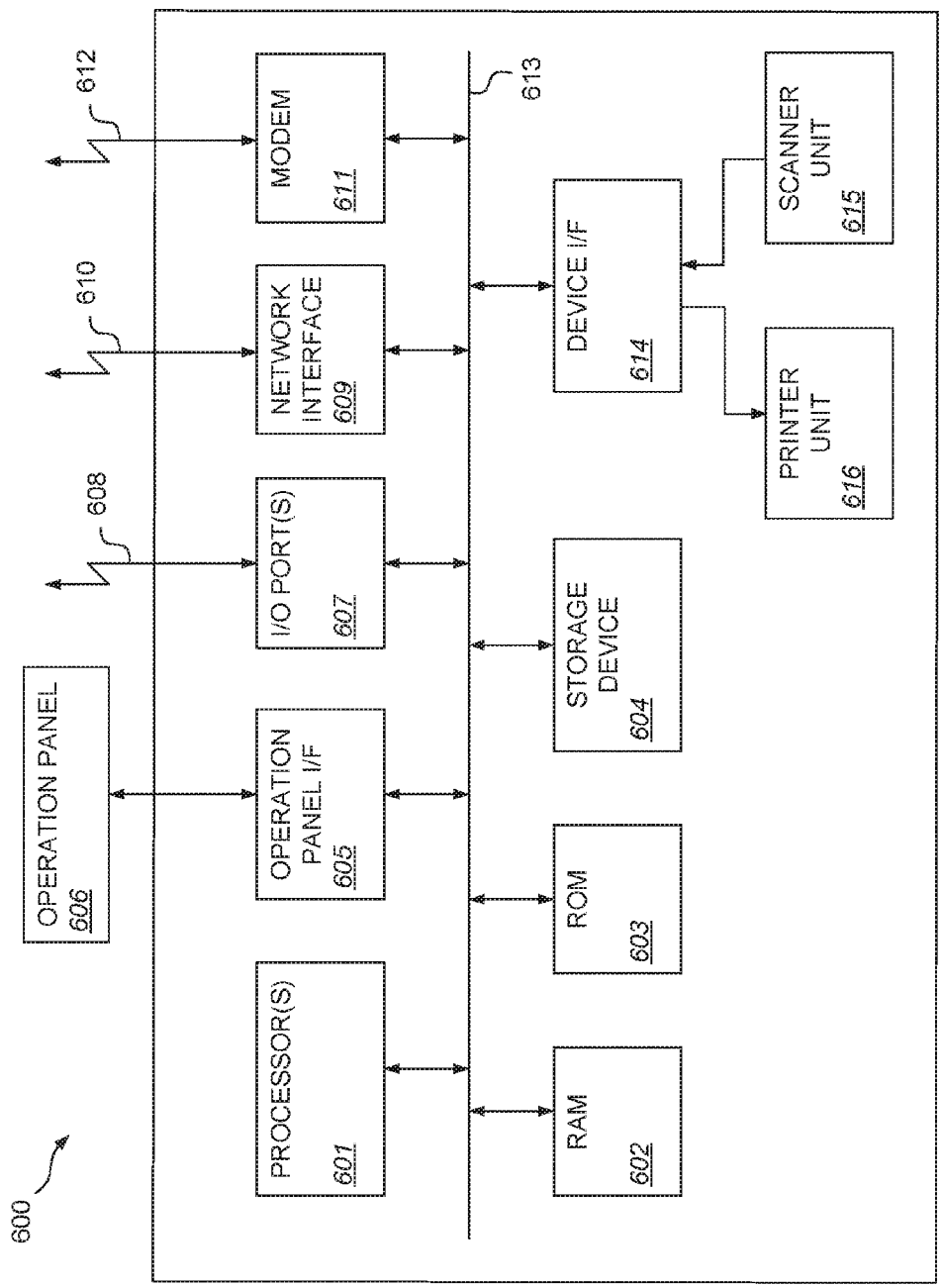
FIG. 6 illustrates an exemplary image processing device

FIG. 6 illustrates an example image processing device 600 which may also be image processing device 1000 in FIG. 3. The image processing device 600 of FIG. 2 is a multifunction peripheral having a scanning function in addition to printing, copying and other functions. However, it will be understood that various other implementations of an image processing device are within the scope of the present invention. For example, various components, modules, functions, and/or configurations of the image processing device 600 of FIG. 6 could be combined, deleted, or modified to form further implementations. Further by way of example, in some embodiments, other devices (for example, a stand-alone scanner, fax machine, or other device with scanning capabilities) and/or computing systems (for example, a computer connected to a scanner) may be implemented as the image processing device 600.

In some embodiments, the image processing device 600 performs one or more operations described herein. In some embodiments, the image processing device 600 provides functionality described herein. In some embodiments, software running on the image processing device 600 performs one or more operations described herein.

The image processing device 600 includes one or more processor(s) 601. The processor(s) 601 include a central processing unit (CPU) that performs overall control functions for the image processing device 600. The CPU uses a random access memory (RAM) 602 as a work area while executing instructions. The CPU executes instructions of various programs stored in one or more memory devices.

For example, the CPU executes programs stored in a read only memory (ROM) 603 and in a storage device 604. The one or more processors 601 may include the controller 1001, the setting processor 1002 and the configuration processor 1004 described above in FIG. 3.

In some embodiments, the processor(s) 601 include one or more processors in addition to the CPU. By way of example, the processor(s) 601 may include one or more general-purpose microprocessor(s), application-specific microprocessor(s), and/or special purpose microprocessor(s). Additionally, in some embodiments the processor(s) 601 may include one or more internal caches for data or instructions.

The processor(s) 601 provide the processing capability required to execute an operating system, application programs, and various other functions provided on the image processing device 600. The processor(s) 601 perform or cause components of the image processing device 600 to perform various operations and processes described herein, in accordance with instructions stored in one or more memory devices.

The RAM 602 is used as a work area when the processor(s) 601 execute various instructions, such as those making up computer programs stored in the ROM 603 and/or the storage device 604. The RAM 602 may be used as a temporary storage area for various data, including input image data. The RAM 602 may be used as a cache memory. In some embodiments, the RAM may be dynamic RAM (DRAM) or static RAM (SRAM).

The ROM 603 stores data and programs having computer-executable instructions for execution by the processor(s) 601. In some embodiments, the ROM 603 is a boot ROM, storing instructions for the booting process. In some embodiments, the ROM 603 may be flash memory.

The storage device 604 stores application data, program modules and other information. In some embodiments, the application 1014 resides on the storage device 604 and executes on the image processing device 600.

The storage device 604 also stores other programs and data to be processed. For example, the storage device 604 stores an operating system including programs and data for managing hardware and software components of the image processing device 600. Applications on the image processing device 600 may utilize the operating system to perform various operations. The storage device 604 may further store other programs and/or drivers that enable various functions of the image processing device 600, graphical user interface (GUI) functions, and/or processor functions. The storage device 604 may also store data files including, for example, image data, user data, configuration information, GUI components, such as graphical elements or templates, or other data required by the image processing device 600.

In some embodiments, the image processing device 600 may include other storage media. By way of example, and not by way of limitation, the storage media may include a floppy disk drive, flash memory, an optical disc, a magneto-optical disc, magnetic tape, or a Universal Serial Bus (USB) drive or a combination of two or more of these. Where appropriate, the storage media may include removable or fixed media. Where appropriate, the storage media may be internal or external to the image processing device 600. In some embodiments, the storage media is non-volatile, solid-state memory. The storage media may take any suitable physical form. For example, the storage media may be in the form of one or more removable blocks, modules, or chips. The computer-readable storage medium need not be one physical memory device, but can include one or more separate memory devices.

An operation panel interface 605 provides output signals to and receives input signals from an operation panel 606. Regarding the output signals, the operation panel interface 605 provides GUI data to the operation panel 606 for display on a liquid crystal display (LCD). Regarding the input signals, the operation panel interface 605 receives input signals based on user input operations at the operation panel 606 and relays the input signals to the processor(s) 601. In some embodiments, the operation panel 606 includes a touch sensitive element operable to receive user input operations or commands based on the touching of graphical objects displayed on the LCD. In some embodiments, the operation panel 606 includes a hard key panel. In some embodiments, the operation panel may include the input mechanism 1030 of FIG. 3.

The image processing device 600 includes one or more input/output (I/O) port(s) 607. The I/O port(s) 607 may include any suitable interface type such as a universal serial bus (USB) port, FireWire port (IEEE-1394), serial port, parallel port, or AC/DC power connection port. The I/O port(s) 607 enable one or more external device(s) 608 to communicate with the image processing device 600 when the external device(s) 608 is/are connected to the I/O port(s) 607. Examples of external devices 608 include a near field communication (NFC) interface (for example, an NFC reader), a smart card reader, radio-frequency identification (RFID) reader, device for detecting biometric information, a keyboard, keypad, sensor(s), a combination of two or more of these, or other suitable device.

A network interface 609 includes hardware, software, or both providing one or more interfaces for communication (such as, for example, packet-based communication) between the image processing device 600 and one or more other computing systems or one or more networks 610. As an example and not by way of limitation, the network interface 609 may include a network interface card (NIC) or a network controller for communicating with an Ethernet or other wire-based network or a wireless NIC (WNIC) or wireless adapter for communicating with a wireless network, such as a WI-FI network. This disclosure contemplates any suitable network 610 and any suitable network interface 609 for it. As an example and not by way of limitation, the image processing device 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks 610 may be wired or wireless. As an example, the image processing device 600 may communicate with a wireless PAN (WPAN) (such as, for example, a BLUETOOTH WPAN), a WI-FI network, a WI-MAX network, or other suitable wireless network or a combination of two or more of these. The image processing device 600 may include any suitable network interface 609 for any of these networks 610, where appropriate.

A modem 611 modulates/demodulates image data and control signals. The modem 611 is connected to the Public Switched Telephone Network (PSTN) 63 and performs input/output of information between the image processing device 600 and the PSTN 63. By way of example, the modem 611 may send/receive facsimile communications.

A system bus 613 interconnects various components of the image processing device 600 thereby enabling the transmission of data and execution of various processes. The system bus 613 may include one or more types of bus structures including a memory bus or memory controller, a peripheral bus, and a local bus using any of a variety of bus architectures.

The device interface 614 is connected to the scanner unit 615 and to the printer unit 616. The device interface 614 performs synchronous/asynchronous conversion of image data.

The scanner unit 615 includes a light source and an image sensor. The scanner unit 615 may include a glass platen and/or an automatic document feeder (ADF). In operation, the light source illuminates a physical document positioned on the glass platen or fed by the ADF. Light reflected by the physical document reaches the image sensor, and the image sensor converts the light into electrical signals. In some embodiments, the scanner unit 615 includes an optical system (for example, mirrors, lens) that directs the light to the image sensor. After the image sensor generates the electrical signals, an analog-to-digital converter converts the electrical signals to digital image data representing the scanned physical document. The scanner unit 615 then outputs the digital image data to one or more other components of the image processing device 600 via the device interface 614.

The printer unit 616 is an image output device for printing on a sheet an image corresponding to image data. In response to a print command received at the image processing device 600, the printer unit 616 receives image data via the device interface 614 and outputs to a sheet an image corresponding to the image data.

Figure 7:
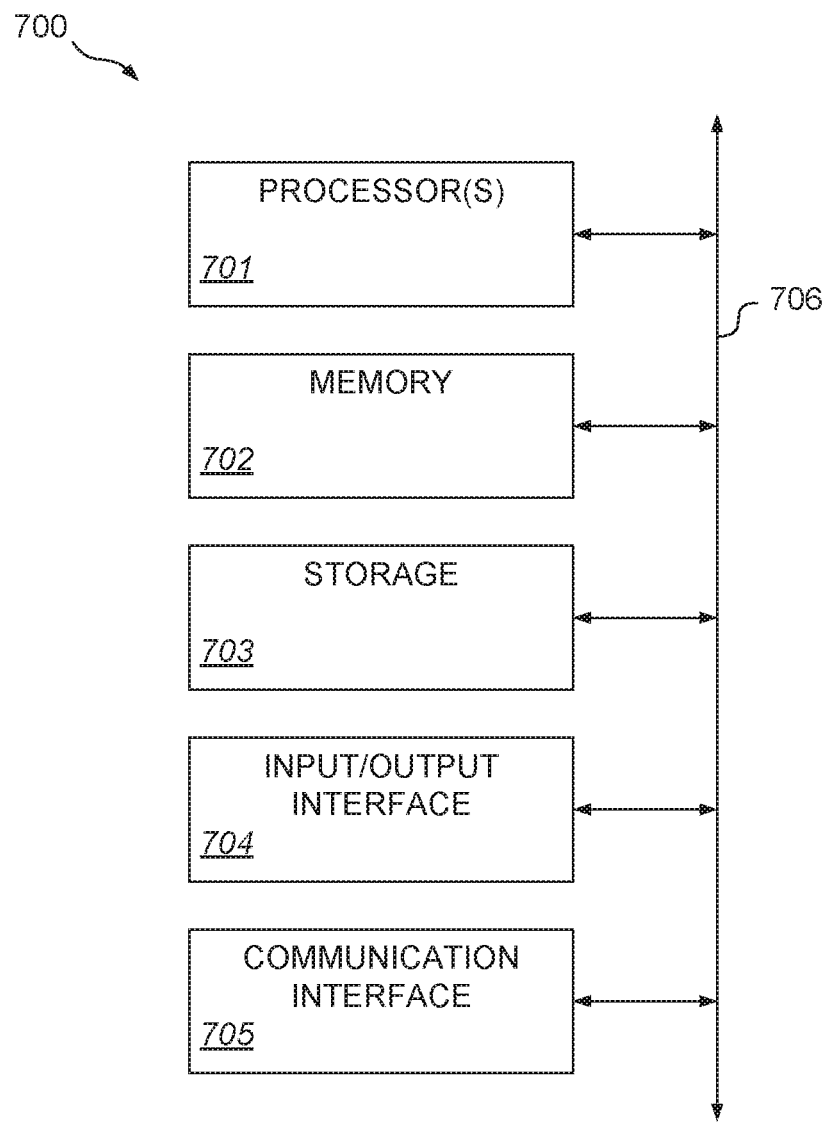
FIG. 7 illustrates an exemplary computing system.

FIG. 7 illustrates an example computing system 700. According to various embodiments, all or a portion of the description of the computing system 700 is applicable to all or a portion of one or more of the image processing device 1000, the computing devices 201a/201b, first printer controller 210 and second printer controller 220, and one or more server(s) that may be embodied in the operational environment.

The term computing system as used herein includes but is not limited to one or more software modules, one or more hardware modules, one or more firmware modules, or combinations thereof, that work together to perform operations on electronic data. The physical layout of the modules may vary. A computing system may include multiple computing devices coupled via a network. A computing system may include a single computing device where internal modules (such as a memory and processor) work together to perform operations on electronic data. Also, the term resource as used herein includes but is not limited to an object that can be processed at a computing system. A resource can be a portion of executable instructions or data.

In some embodiments, the computing system 700 performs one or more steps of one or more methods described or illustrated herein. In some embodiments, the computing system 700 provides functionality described or illustrated herein. In some embodiments, software running on the computing system 700 performs one or more steps of one or more methods described or illustrated herein or provides functionality described or illustrated herein. Some embodiments include one or more portions of the computing system 700.

The computing system 700 includes one or more processor(s) 701, memory 702, storage 703, an input/output (I/O) interface 704, a communication interface 705, and a bus 706. The computing system 700 may take any suitable physical form. For example, and not by way of limitation, the computing system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, PDA, a server, a tablet computer system, or a combination of two or more of these.

The processor(s) 701 include hardware for executing instructions, such as those making up a computer program. The processor(s) 701 may retrieve the instructions from the memory 702, the storage 703, an internal register, or an internal cache. The processor(s) 701 then decode and execute the instructions. Then, the processor(s) 701 write one or more results to the memory 702, the storage 703, the internal register, or the internal cache. The processor(s) 701 may provide the processing capability to execute the operating system, programs, user and application interfaces, and any other functions of the computing system 700.

The processor(s) 701 may include a central processing unit (CPU), one or more general-purpose microprocessor(s), application-specific microprocessor(s), and/or special purpose microprocessor(s), or some combination of such processing components. The processor(s) 701 may include one or more graphics processors, video processors, audio processors and/or related chip sets.

In some embodiments, the memory 702 includes main memory for storing instructions for the processor(s) 701 to execute or data for the processor(s) 701 to operate on. By way of example, the computing system 700 may load instructions from the storage 703 or another source to the memory 702. During or after execution of the instructions, the processor(s) 701 may write one or more results (which may be intermediate or final results) to the memory 702. One or more memory buses (which may each include an address bus and a data bus) may couple the processor(s) 701 to the memory 702. One or more memory management units (MMUs) may reside between the processor(s) 701 and the memory 702 and facilitate accesses to the memory 702 requested by the processor(s) 701. The memory 702 may include one or more memories. The memory 702 may be random access memory (RAM).

The storage 703 stores data and/or instructions. As an example and not by way of limitation, the storage 703 may include a hard disk drive, a floppy disk drive, flash memory, an optical disc, a magneto-optical disc, magnetic tape, or a Universal Serial Bus (USB) drive or a combination of two or more of these. In some embodiments, the storage 703 is a removable medium. In some embodiments, the storage 703 is a fixed medium. In some embodiments, the storage 703 is internal to the computing system 700. In some embodiments, the storage 703 is external to the computing system 700. In some embodiments, the storage 703 is non-volatile, solid-state memory. In some embodiments, the storage 703 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. The storage 703 may include one or more memory devices. One or more program modules stored in the storage 703 may be configured to cause various operations and processes described herein to be executed.

The I/O interface 704 includes hardware, software, or both providing one or more interfaces for communication between the computing system 700 and one or more I/O devices. The computing system 700 may include one or more of these I/O devices, where appropriate. One or more of these I/O devices may enable communication between a person and the computing system 700. As an example and not by way of limitation, an I/O device may include a keyboard, keypad, microphone, monitor, mouse, speaker, still camera, stylus, tablet, touch screen, trackball, video camera, another suitable I/O device or a combination of two or more of these. An I/O device may include one or more sensors. In some embodiments, the I/O interface 704 includes one or more device or software drivers enabling the processor(s) 701 to drive one or more of these I/O devices. The I/O interface 704 may include one or more I/O interfaces.

The communication interface 705 includes hardware, software, or both providing one or more interfaces for communication (such as, for example, packet-based communication) between the computing system 700 and one or more other computing systems or one or more networks. As an example and not by way of limitation, the communication interface 705 may include a network interface card (NIC) or a network controller for communicating with an Ethernet or other wire-based network or a wireless NIC (WNIC) or wireless adapter for communicating with a wireless network, such as a WI-FI network. This disclosure contemplates any suitable network and any suitable communication interface 705 for it. As an example and not by way of limitation, the computing system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the computing system 700 may communicate with a wireless PAN (WPAN) (such as, for example, a Bluetooth WPAN or an ultra wideband (UWB) network), a WI-FI network, a WI-MAX network, a cellular telephone network (such as, for example, a Global System for Mobile Communications (GSM) network), or other suitable wireless network or a combination of two or more of these. The computing system 700 may include any suitable communication interface 705 for any of these networks, where appropriate. The communication interface 705 may include one or more communication interfaces 705.

The bus 706 interconnects various components of the computing system 700 thereby enabling the transmission of data and execution of various processes. The bus 706 may include one or more types of bus structures including a memory bus or memory controller, a peripheral bus, and a local bus using any of a variety of bus architectures.

The above description serves to explain principles of the invention; but the invention should not be limited to the examples described above. For example, the order and/or timing of some of the various operations may vary from the examples given above without departing from the scope of the invention. Further by way of example, the type of network and/or computing systems may vary from the examples given above without departing from the scope of the invention. Other variations from the above-recited examples may also exist without departing from the scope of the invention.

The scope of the present invention includes a computer-readable medium storing instructions that, when executed by one or more processors, cause the one or more processors to perform one or more embodiments of the invention described herein. Examples of a computer-readable medium include a hard disk, a floppy disk, a magneto-optical disk (MO), a compact-disk read-only memory (CD-ROM), a compact disk recordable (CD-R), a CD-Rewritable (CD-RW), a digital versatile disk ROM (DVD-ROM), a DVD-RAM, a DVD-RW, a DVD+RW, magnetic tape, a nonvolatile memory card, and a ROM. Computer-executable instructions can also be supplied to the computer-readable storage medium by being downloaded via a network.

While the present invention has been described with reference to exemplary embodiments, it is to be understood that the invention is not limited to the disclosed exemplary embodiments.

I claim:

1. A image processing device comprising:
    an input mechanism responsive to input received from a user and which generates a signal indicative of a printer controller selected from a set of printer controllers to be associated with the image processing device
    a controller; and
    a memory storing an application therein, the application, when executed by the controller causes the image processing device to:
        monitor, at initiation of the image processing device, a communication address assigned to the image processing device to detect whether a current communication address is different from a previously assigned communication address the communication address indicative of the print controller selected from the set of print controllers,
        monitor the signal from the input mechanism;
        identify a communication address for the printer controller using the signal to determine whether the current communication address is equivalent to the identified communication address in the signal;
        acquire, from the memory, a configuration data object associated with the current communication address in response to detecting, at initiation, that the current communication address is different from the previously assigned communication address, the configuration data object being associated with the current communication address and including one or more parameters for controlling one or more operations of the image processing device, and
        automatically configure the image processing device using the one or more parameters acquired from the configuration data object.

2. The image processing device according to claim 1, wherein a current communication address is associated with a first printer controller and a second communication address is associated with a second, different printer controller.

3. The image processing device according to claim 1, wherein the application controls the image processing device to
    initiate a reboot of the image processing device in response to determining that the identified communication address is different from the current communication address.

4. The image processing device according to claim 1, wherein
    initiation of the image processing device includes at least one of (a) initial startup in response to the image processing device being powered on; and (b) a reboot of the image processing device.

5. The image processing device according to claim 1, wherein
    the current communication address was set prior to initiation of the image processing device and is associated with an external printer controller selected from a set of external printer controllers, each respective external printer controller having a unique communication address associated therewith for assignment to the image processing device to enable communication between the respective external printer controller and the image processing device.

6. The image processing device according to claim 1, wherein the application controls the image processing device to
detect a signal indicating that the current communication address is to be changed to an updated communication address different from the current communication address;
set the current communication address as a previously registered communication address; and
set the updated communication address as the current communication address; and
initiate a reboot of the image processing device.

7. The image processing device according to claim 1, wherein
the current communication address and previously registered communication address are different private IP addresses.

8. A method of controlling an image processing device to be in communication with one of a plurality of external printer controllers, the method comprising:
monitoring, at initiation of the image processing device, a communication address assigned to the image processing device to detect whether a current communication address is different from a previously assigned communication address, the communication address indicative of the print controller selected from the set of print controllers,
monitoring a signal generated by an input mechanism, the signal being received from a user and indicative of a printer controller selected from a set of printer controllers to be associated with the image processing device,
identifying a communication address for the printer controller using the signal to determine whether the current communication address is equivalent to the identified communication address in the signal,
acquiring, from memory, a configuration data object associated with the current communication address in response to detecting, at initiation, that the current communication address is different from the previously assigned communication address, the configuration data object being associated with the current communication address and including one or more parameters for controlling one or more operations of the image processing device, and
automatically configure the image processing device using the one or more parameters acquired from the configuration data object.

9. The method according to claim 8, wherein a current communication address is associated with a first printer controller and a second communication address is associated with a second, different printer controller.

10. The method according to claim 8, further comprising initiating a reboot of the image processing device in response to determining that the identified communication address is different from the current communication address.

11. The method according to claim 8, wherein
initiation of the image processing device includes at least one of (a) initial startup in response to the image processing device being powered on; and (b) a reboot of the image processing device.

12. The method according to claim 8, wherein
the current communication address was set prior to initiation of the image processing device and is associated with an external printer controller selected from a set of external printer controllers, each respective external printer controller having a unique communication address associated therewith for assignment to the image processing device to enable communication between the respective external printer controller and the image processing device.

13. The method according to claim 8, further comprising
detecting a signal indicating that the current communication address is to be changed to an updated communication address different from the current communication address;
setting the current communication address as a previously registered communication address;
setting the updated communication address as the current communication address; and
initiating a reboot of the image processing device.

14. The method according to claim 8, wherein
the current communication address and previously registered communication address are different private IP addresses.

15. A non-transitory computer readable storage medium storing instructions that, when executed by a controller, cause an image processing device to execute a method of controlling an image processing device to be in communication with one of a plurality of external printer controllers, the method comprising:
monitoring, at initiation of the image processing device, a communication address assigned to the image processing device to detect whether a current communication address is different from a previously assigned communication address, the communication address indicative of the print controller selected from the set of print controllers,
monitoring a signal generated by an input mechanism, the signal being received from a user and indicative of a printer controller selected from a set of printer controllers to be associated with the image processing device,
identifying a communication address for the printer controller using the signal,
determining whether the current communication address is equivalent to the identified communication address,
acquiring, from memory, a configuration data object associated with the current communication address in response to detecting, at initiation, that the current communication address is different from the previously assigned communication address, the configuration data object being associated with the current communication address and including one or more parameters for controlling one or more operations of the image processing device, and
automatically configure the image processing device using the one or more parameters acquired from the configuration data object.

* * * * *